(No Model.)

W. S. CRANMER.
BICYCLE.

No. 481,476. Patented Aug. 23, 1892.

Witnesses:
J. A. Bayless

Inventor,
William S. Cranmer
By Dewey & Co.
Attys

United States Patent Office.

WILLIAM S. CRANMER, OF SONOMA, CALIFORNIA.

BICYCLE.

SPECIFICATION forming part of Letters Patent No. 481,476, dated August 23, 1892.

Application filed February 12, 1892. Serial No. 421,304. (No model.)

*To all whom it may concern:*

Be it known that I, WILLIAM S. CRANMER, a citizen of the United States, residing at Sonoma, Sonoma county, State of California, have invented an Improvement in Bicycles; and I hereby declare the following to be a full, clear, and exact description of the same.

My invention relates to bicycles, and especially to that class in which an endless chain is employed to transmit the power of the crank-shaft to the driving-wheel.

My invention consists in a bicycle, the rear or driving-wheel of which is made larger in diameter than is usual in this class of machines, and said wheel is driven by two endless chains, one on each side, said chains receiving their power from independent crank-axles located back of the driving-wheel front, thus enabling the saddle of the machine to be set as far back as may be desired, all of which I shall hereinafter fully explain, together with details of construction and arrangement.

The object of my invention is to provide a bicycle of this class with a large driving-wheel, and by reason of the particular arrangement of its driving connections provide for the setting back of the saddle, as far as may be desired, in order that the weight of the rider may be borne by the two wheels in proportion to their size.

Figure 1:
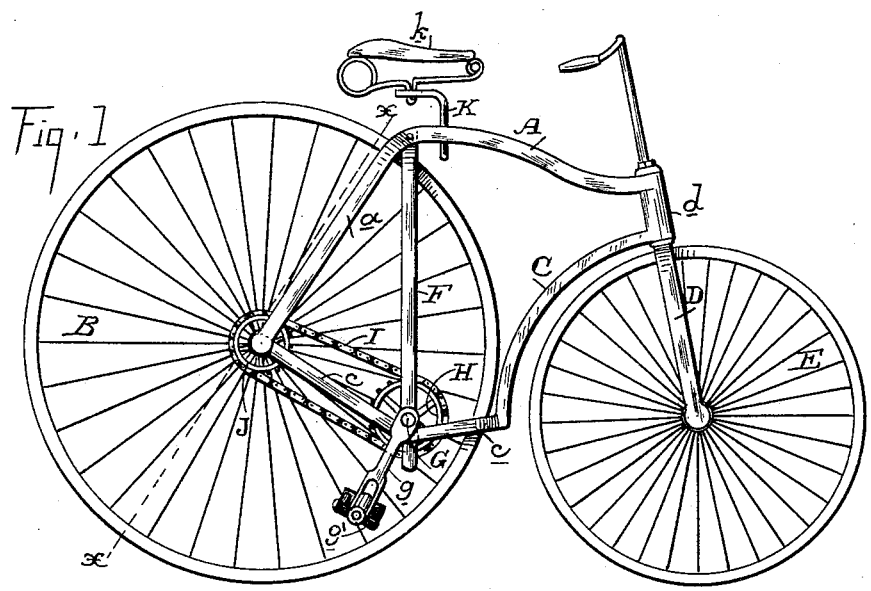
Figure 2:
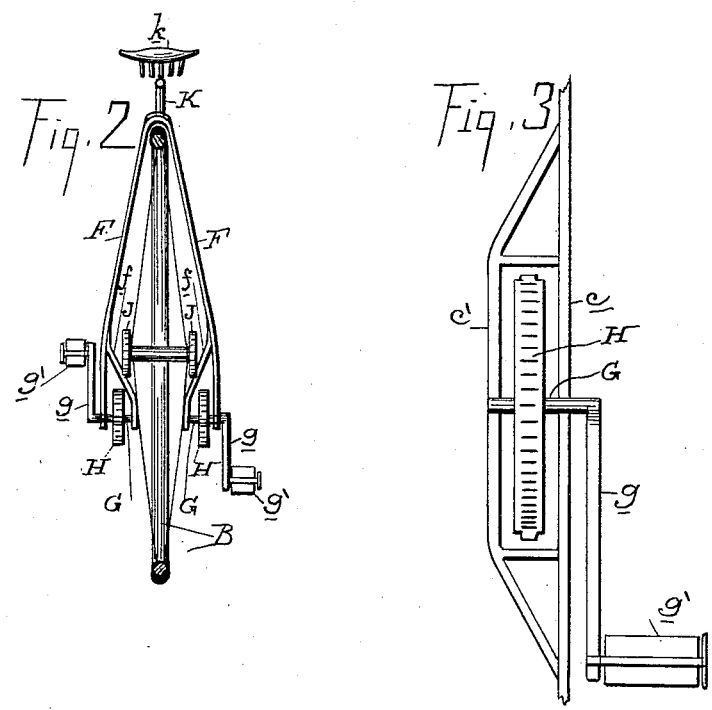
Figure 3:
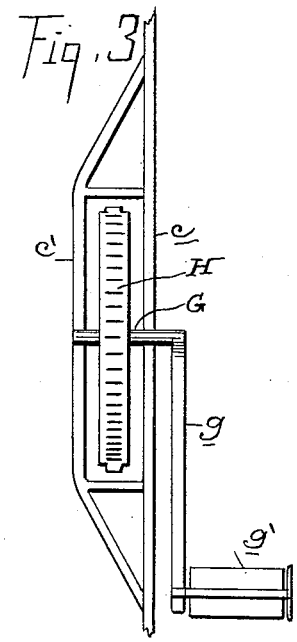

Referring to the accompanying drawings for a more complete explanation of my invention, Figure 1 is a side elevation of my bicycle. Fig. 2 is a section on line $x$ $x$ of Fig. 1 looking from the front. Fig. 3 is a bottom view of the crank-axle bearing.

A is the backbone of the frame of the machine. This at its forward portion is a single bar but its rear portion $a$, where it reaches the rear driving-wheel B, is forked on each side thereof, and in its lower end the said driving-wheel is properly mounted.

C is the bottom bar of the frame. This at its forward portion is likewise a single bar, but where it reaches the drive-wheel it is forked into portions $c$, the rear ends of which are connected properly with the rear ends $a$ of the backbone.

The forward ends of the frame-bars A and C are connected by a proper steering center at $d$ with the front forks D of the machine, in which said forks is mounted the front or steering wheel E.

Between the backbone A and the bottom bar C are the vertical braces F, extending down, one on each side of the drive-wheel B. These are connected at their upper ends to the backbone and at their lower ends to the bottom bar C. These braces serve to stiffen the frame.

Mounted in the lower portion of the frame are short shafts G, one on each side of the drive-wheel B and each carrying a crank $g$ with a pedal $g'$.

Upon each short shaft G is a chain-gear H, from each of which a drive-chain I extends to a chain-gear J on the axle of the drive-wheel B. There are two of these gears J on said axle, one on each side of the wheel, and the chain-gears H lie one on each side of the wheel, so that the chains I are on each side thereof, and the power of the crank-shafts G is separately transmitted from each pedal to the drive-wheel.

K is the saddle-standard, mounted suitably upon the backbone A, and $k$ is the saddle suitably supported from said standard.

Any suitable boxes or bearings may be made in the frame for the crank-shafts G. I have here shown the portions $c$ of the bottom bar C as having inner straps $c'$, and the lower portions of the upright braces F as having inner straps $f$, said straps forming, with the portions to which they are attached, a kind of housing or bearing in which the short shafts G are suitably mounted. Now it will be seen that the drive-wheel B is of greater diameter than is usually found in this class of bicycles. The object is to provide a machine more easily driven by reason of its large wheel than the ordinary machine which has approximately the same-sized drive-wheel as steering-wheel. The large diameter of my drive-wheel is further advantageous in making what may be termed a "close-coupled" machine, resulting in easier driving and steering. The wheel B being large comes near to the front or steering wheel E, and thus constitutes the larger portion of the length of the machine. It becomes necessary, therefore, to set the saddle as far back of the line between the two wheels, as desirable, to insure safety and to distribute the weight in proportion to the size of the wheels, and in thus setting the saddle back it becomes necessary to set the driving mechanism back beyond the plane between the two wheels in order to have the work directly below the rider, so that he can have a direct perpendicular push upon the pedals. The driving mechanism must therefore lie back of the driving-wheel front, and in order to do this it is necessary to have separate or independent crank-axles, which also involves the necessity of having a driving-chain on each side of the main wheel. Thus it will be seen that the construction and relative arrangement and location of parts are made to conform to the main object of the invention—namely, the provision of a large driving-wheel and the adjustment of the saddle, so that the weight of the rider may be borne by both wheels in proportion to their size.

Having thus described my invention, what I claim as new, and desire to secure by Letters Patent, is—

1. In a bicycle of the Safety type, the combination of a front steering-wheel, a rear driving-wheel of larger diameter, a frame closely connecting the two wheels and consisting of the backbone A and bottom bar C, both forked over the rear driving-wheel, separate crank-axles journaled in the bottom bar C on each side of the driving-wheel back of its front, independent chain-gearing on each side of the driving-wheel for transmitting the motion of the cranks thereto, a seat carried by the backbone of the frame in the vertical plane of the crank-axles, and the vertical brace-bars F on each side of the driving-wheel in the perpendicular plane of the crank-axles and seat and connecting the bottom bar and backbone of the frame, substantially as herein described.

2. In a bicycle of the Safety type, the combination of a front steering-wheel, a rear driving-wheel of larger diameter, a frame closely connecting the two wheels and consisting of backbone A and bottom bar C, the vertical brace-bars F on each side of the driving-wheel and connecting the backbone and bottom bar, the inner straps $c'$ and $f$ of the bottom bar and brace-bars, respectively, the independent crank-axles mounted in bearings formed by said bar and brace-bars with their straps, the independent chain-gearing from said crank-axles to the rear driving-wheel, and the seat supported by the backbone and lying in the perpendicular plane of the crank-axles and vertical brace-bars, substantially as herein described.

In witness whereof I have hereunto set my hand.

WILLIAM S. CRANMER.

Witnesses:
ROBERT A. POPPE,
D. M. ESHBACH.